(12) United States Patent
Hoebel et al.

(10) Patent No.: US 7,705,264 B2
(45) Date of Patent: Apr. 27, 2010

(54) METHOD FOR CONTROLLING THE MICROSTRUCTURE OF A LASER METAL FORMED HARD LAYER

(75) Inventors: Matthias Hoebel, Windisch (CH); Edward Obbard, Jersey (GB); Alexander Schnell, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 200 days.

(21) Appl. No.: 11/071,171

(22) Filed: Mar. 4, 2005

(65) Prior Publication Data

US 2006/0081571 A1 Apr. 20, 2006

Related U.S. Application Data

(63) Continuation of application No. PCT/CH03/00515, filed on Jul. 29, 2003.

(30) Foreign Application Priority Data

Sep. 6, 2002 (EP) .................................. 02405771

(51) Int. Cl.
*B23K 26/00* (2006.01)
(52) U.S. Cl. .............................. 219/121.64; 219/121.66; 219/121.63; 219/121.65
(58) Field of Classification Search ............ 219/121.64, 219/121.66, 121.85, 121.65, 121.63
See application file for complete search history.

(56) References Cited

U.S. PATENT DOCUMENTS

| 3,690,367 A | 9/1972 | Daniels |
| 4,015,100 A | 3/1977 | Gnanamuthu et al. |
| 4,212,900 A | 7/1980 | Serlin |
| 4,323,756 A | 4/1982 | Brown et al. |

(Continued)

FOREIGN PATENT DOCUMENTS

DE 198 53 733 C 2/2000

(Continued)

OTHER PUBLICATIONS

Anne-Claire Legrand et al., "Machine Vision Systems in the Matallurgy Industry", Journal of Electronic Imaging, ISSN: 1017-9909, Jan. 2001, pp. 274-282, XP001087049, vol. 10, No. 1, SPIE + IS&T, US.

(Continued)

*Primary Examiner*—M. Alexandra Elve
(74) *Attorney, Agent, or Firm*—Buchanan Ingersoll & Rooney PC

(57) ABSTRACT

It is disclosed a method of applying a coating (12) with a controlled laser metal forming process. A light source with a specific power and a signal capturing apparatus is moved over an article (1) to form locally a melt pool (7) on the surface (5) of the article (1) to which a coating powder (8) is injected. An optical signal (13) is captured from the melt pool (7), and the monitored optical signal (13) is used for the determination of the temperature and temperature fluctuations of the melt pool (7). Furthermore, a control system (16) is used to adjust at least one process parameter such as the power of the light source to obtain desired melt pool properties. Subsequently the melt pool (7) solidifies. The high degree of control over the microstructure provides an efficient tool for generating laser metal formed hard coatings (12) with optimised wear properties.

27 Claims, 4 Drawing Sheets

U.S. PATENT DOCUMENTS

| | | | |
|---|---|---|---|
| 4,491,719 A * | 1/1985 | Corby, Jr. | 219/124.34 |
| 4,555,610 A * | 11/1985 | Polad et al. | 219/121.61 |
| 4,644,127 A | 2/1987 | La Rocca | |
| 4,750,947 A | 6/1988 | Yoshiwara et al. | |
| 4,960,501 A | 10/1990 | Sivilotti | |
| 4,981,716 A | 1/1991 | Sundstrom | |
| 5,208,431 A | 5/1993 | Uchiyama et al. | |
| 5,449,536 A | 9/1995 | Funkhouser et al. | |
| 5,486,667 A | 1/1996 | Castonguay et al. | |
| 5,622,638 A | 4/1997 | Schell et al. | |
| 5,659,479 A | 8/1997 | Duley et al. | |
| 5,698,120 A | 12/1997 | Kurosawa et al. | |
| 5,837,960 A | 11/1998 | Lewes et al. | |
| 5,889,254 A | 3/1999 | Jones | |
| 5,914,059 A | 6/1999 | Marcin, Jr. et al. | |
| 5,985,056 A | 11/1999 | McCay et al. | |
| 6,024,792 A * | 2/2000 | Kurz et al. | 117/9 |
| 6,122,564 A * | 9/2000 | Koch et al. | 700/123 |
| 6,277,500 B1 | 8/2001 | Konter et al. | |
| 6,311,099 B1 | 10/2001 | Jasper et al. | |
| 6,459,951 B1 * | 10/2002 | Griffith et al. | 700/166 |
| 6,504,127 B1 * | 1/2003 | McGregor et al. | 219/121.63 |
| 6,580,959 B1 * | 6/2003 | Mazumder | 700/121 |
| 6,623,876 B1 | 9/2003 | Caron | |
| 2002/0142107 A1 * | 10/2002 | Mazumder et al. | 427/596 |

FOREIGN PATENT DOCUMENTS

| | | |
|---|---|---|
| DE | 198 53 733 C1 | 2/2000 |
| DE | 199 49 972 C1 | 2/2001 |
| EP | 0 558 870 A1 | 9/1993 |
| EP | 0 740 977 A1 | 11/1996 |
| EP | 0 749 790 A1 | 12/1996 |
| JP | 61-023864 | 8/1987 |
| JP | 2000-218383 | 8/2000 |
| WO | 95/06540 | 3/1995 |
| WO | 95/35396 | 12/1995 |

OTHER PUBLICATIONS

J. Laeng et al., "Laser Metal Forming Processes for Rapid Prototyping—A Review", International Journal of Production Research, ISSN: 0020-7643, Nov. 10, 2000, pp. 3973-3996, XP00800214, vol. 38, No. 16, Taylor and Francis, Great Britain.

* cited by examiner

METHOD FOR CONTROLLING THE MICROSTRUCTURE OF A LASER METAL FORMED HARD LAYER

RELATED APPLICATIONS

This application claims priorities under 35 U.S.C. §119 to European Application No. 02405771.3 filed Sep. 6, 2002, and as a Continuation Application Under 35 U.S.C. §120 to PCT Application No. PCT/CH2003/000515 filed as an International Application on Jul. 29, 2003 designating the U.S., the entire contents of which are hereby incorporated by reference in their entireties.

FIELD OF THE INVENTION

The invention relates to a method of applying a laser metal formed hard layer on the surface of an article with a laser metal forming process allowing for a high degree of control over the microstructure. It provides an efficient tool for generating laser metal formed hard layers with optimised wear properties.

BACKGROUND OF THE INVENTION

In the last years laser metal forming (LMF) has been introduced in industrial manufacturing. Laser metal forming is a process where a high power laser locally melts a focussed stream of metal powder or a metal wire onto a substrate. In this way material can be added to the underlying part. The method is suitable for controlled material build-up and the laser generated parts are characterised by a dense microstructure which is usually free of pores.

Laser metal forming has been recently used for commercial manufacturing of superalloy components due to its attractive potential for repair of locally damaged or worn parts. Indeed, it is possible to selectively add material at desired locations and to re-establish the full functionality of a component. It is clear that laser repair technology is particularly attractive for the refurbishment of expensive parts that are affected by local damage or local mechanical wear. Turbine or compressor components such as blades and vanes are typical examples.

During laser metal forming substrate material is locally molten and powder (or wire) is injected into the melt pool with a suitable powder (or wire) feeder mechanism. After a certain interaction time (which is determined by the laser spot size and the relative movement between laser and substrate) the molten material resolidifies leading to material build-up on the substrate.

So far, several patents have been issued for the laser metal forming process. The basic principle is described in EP-A1-0 558 870, DE-C1-199 49 972, DE-C1-198 53 733, U.S. Pat. No. 5,873,960, U.S. Pat. No. 5,622,638 or U.S. Pat. No. 4,323,756.

The application of epitaxial material build-up for protective coatings is covered by U.S. Pat. No. 6,277,500, applications for generation or refurbishment of single crystal components are described in U.S. Pat. No. 6,024,792, EP-A1-0 740 977, WO95/35396 or U.S. Pat. No. 5,914,059. Except U.S. Pat. No. 6,024,792 none of these patents mentions the significance of temperature information from the melt pool in order to obtain a desired microstructure. U.S. Pat. No. 6,024,792 states that the laser power has to be set in a way to obtain adequate values for temperature gradient G and solidification velocity $V_s$, in order to obtain epitaxial growth on the substrate, however does not suggest a method for automatic laser power control in order to obtain a specific microstructure which results in optimum hardness or wear properties or for avoiding melt pool convections.

Another patent application, WO95/06540 suggests the use of a pyrometer for interactive laser welding of super alloy articles measuring the substrate pre-heating temperature.

The collection of optical signals from the melt pool is also depicted in U.S. Pat. No. 6,122,564. In this patent, an optical monitoring system is connected to a feed-back controller in order to adjust the material deposition rate depending on the indicated height of previously deposited material.

In U.S. Pat. No. 6,311,099 an apparatus for regulating laser welding parameters is suggested that uses optical signals from the interaction zone. In this patent the optical signal is generated by near infrared radiation originating from the weld pool. The radiation is detected by a CCD camera and processed in order to obtain information about the physical dimensions of the melt pool.

Previous inventions have not combined the laser metal forming process with this high degree of process control. Some superficially similar patents such as U.S. Pat. No. 4,212,900, U.S. Pat. No. 4,750,947, U.S. Pat. No. 4,015,100 do not utilise the same LMF process, and therefore suffer the disadvantages of necessitating a two step coating-melting process or of not incorporating the addition of coating material as disclosed in U.S. Pat. No. 5,659,479.

Those patents such as U.S. Pat. No. 4,644,127, U.S. Pat. No. 4,981,716, U.S. Pat. No. 5,208,431 or U.S. Pat. No. 5,889,254 utilising the powder and laser beam combination do not aim to monitor the melt condition during the process and are therefore unable to attain a comparable degree of process control. U.S. Pat. No. 5,449,536 explaining the laser deposition of a powder-based hard coating does not attempt to melt the workpiece, and instead relies on the agglomeration of heated powder particles to create a coating layer. Some previous work has used a similar coaxial laser/pyrometer signal arrangement (see U.S. Pat. No. 5,486,667). However the application in this case relates to laser cutting and machining and, moreover, the pyrometer is monitoring the plasma plume rather than the melt pool; in the present invention, which utilises solely a conduction heating regime, there is no plasma plume. In U.S. Pat. No. 5,985,056), a continuous feedback system is used to monitor "a measured parameter" and to control the laser beam power. However if used in this case, a pyrometer signal measured only the bulk workpiece temperature, rather than the melt pool, and spectroscopic measurements of process light were not used to monitor the melt pool temperature.

SUMMARY OF THE INVENTION

It is therefore the aim of the present invention to provide a means of creating wear-resistant layer such as coatings or parts of the bulk on the surface of an article having microstructural properties, which can easily be controlled by specifying the most influential process variables such as the melt pool temperature.

It was found a method of applying a coating a laser metal formed hard layer with a controlled laser metal forming process on the surface of an article according to the principles of the present invention provides one or more of the advantages described herein.

This enhances the reliability of the manufacturing process and enables the optimisation of the coating microstructure with respect to its wear (or other) behavior. The invention also opens possibilities for creating functionally graded coatings: coatings having different specified properties on various areas of a single component, yet relying on the same hardware and the same coating material. Still, with the inventive method parts of the bulk of the article can be formed.

The coating powder may be composed of multiple metallic or non-metallic constituents, introduced either as a mechanical mixture, or by the use of multi-component agglomeration sintered or coated powder particles. In the latter case, the dense coating or agglomerated material's main constituent is either Ni or Co. A typical example is WC, CrC or $Cr_3C_2$ as hard particles dispersed in a nickel-chrome matrix. A blend of carbides and metal powder such as WC, CrC, $Cr_3C_2$ and NiCr can be used as well. Such a wear and corrosion resistant coating is applied to a turbine or compressor blade in order to reduce wear of the blade against the inside diameter of the engine's casing.

During high temperature treatment, a portion of the initial chrome carbide content of the powder becomes dissolved in the matrix material; during subsequent cooling this material reforms a second carbide distribution amongst the remaining initial carbides. The final microstructure is composed of matrix material, the large, primary carbides and the finer secondary carbides. The degree of carbide dissolution and the rate of subsequent cooling determine the relative proportions and characteristic microstructures of the primary and secondary carbides.

The properties of a coating including, in particular, the wear behavior are altered by changes in the carbide distributions. In the development of an optimised coating, the desire to select the best microstructures demands a degree of control over the most influential process variables. As presented in this invention, measurement of the melt pool temperature gives both a valuable means to characterise a set of conditions and, if implementing the possibility of real-time laser control, enables coatings to be produced at a specified melt pool temperature.

With the online monitoring system and using automatic feed-back control of at least one process parameter such as laser power it is possible to establish and maintain optimum process conditions. Beside the laser power process parameters like the relative speed between laser beam and the substrate, the carrier gas flow, mass feed rate of added material, the distance between the feeder nozzle and the article and the angle of the feeder nozzle to the article can be controlled. In one embodiment according to invention the process parameter are altered for different layers of the coating or for different parts of the same layer of the coating. The present method also facilitates the coating of three dimensional (3D) objects.

Preferably as light source a fibre coupled high power diode laser is used. The inventive method combines laser power delivery, material supply and process monitoring in a dedicated laser/powder head. With this device the powder injection can be concentric with respect to the cone of captured optical signals from the melt pool or the cone of captured optical signals from the melt pool concentric with respect to the light source focusing cone. With the help of a dichroitic mirror infrared (IR) radiation from the melt pool is collected through the same optics which is used for laser focusing. The dichroitic mirror transmits laser light and reflects process light or vice versa.

The process signal from the melt pool can be coupled to a pyrometer or another fiber-coupled detector. For this purpose the optical properties of the monitoring system are chosen such that the measurement spot is smaller than the melt pool and located at the center of the melt pool. In a preferred embodiment according to the invention the optical signal is captured from the center and vicinity of the laser focal spot using a single optical fiber, an imaging fiber bundle or a charged coupled device (CCD) camera that is equipped with suitable optical filters. This information is used to determine the temperature a single spot or simultaneously at several locations in the center and in the vicinity of the melt pool.

The online feed back control of the laser power is decoupled from the main process control by means of a separate microprocessor. This allows faster parallel processing in real-time, i.e. independent from the operating system.

In another embodiment post-processing of the optical signal from the melt pool is used for quality control: The analysis of the measured data allows to optimize process parameters such that a desired microstructure is obtained. Recording of monitoring signals serves also for documentation purposes and for ensuring consistent product quality.

Moreover, dedicated commercially available software tools with enhanced functionality can be used for the realisation of the control system. As a consequence short loop times and advanced PID control features such as gain scheduling can be realised.

BRIEF DESCRIPTION OF THE DRAWINGS

Preferred embodiments of the invention are illustrated in the accompanying drawings, in which.

The drawings show only the parts important for the invention. Same elements will be numbered in the same way in different drawings.

DETAILED DESCRIPTION OF THE INVENTION

Figure 1:
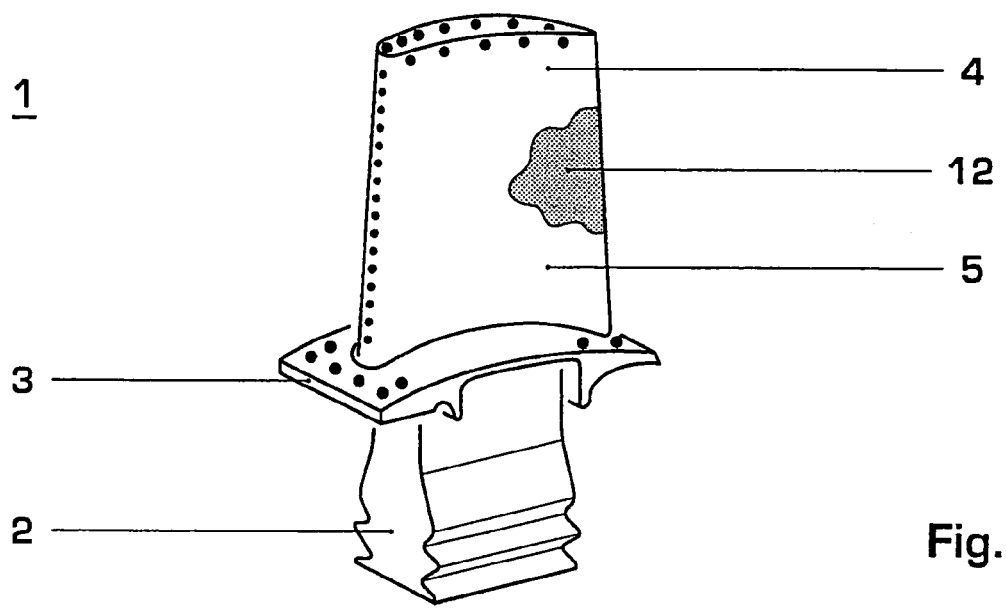
FIG. 1 illustrates a gas turbine blade.

FIG. 1 shows a single crystal (SX) or directionally solidified (DS) article 1 such as blades or vanes of gas turbine engines, the gas turbine blade comprising a root portion 2, a platform 3 and a blade 4 and having surface 5 with a coating 12. The article 1 can as an example be made from a nickel or cobalt based super alloy. Investment casting methods for producing such SX or DS articles are known e.g. from the prior art U.S. Pat. No. 4,96,501, U.S. Pat. No. 3,690,367 or EP-A1-0 749 790. These articles 1 are normally made from a nickel or cobalt base super alloy. However, for the purpose of the present invention, the article 1 could also be a compressor blade made from steel.

The herein disclosed method can be used for coating a substrate material of the article 1. This enhances the reliability of the manufacturing process and enables the optimisation of coating microstructure with respect to its wear (or other) behavior. The invention also opens possibilities for creating functionally graded coatings 12: coatings 12 having different specified properties on various areas of a single component, yet relying on the same hardware and the same coating material. Still, with the inventive method parts of the bulk of the article 1 can be formed.

The coating powder may be composed of multiple metallic or non-metallic constituents, introduced either as a mechanical mixture, or by the use of multi-component agglomeration sintered or coated powder particles. In the latter case, the dense coating or agglomerated material's main constituent is either Ni or Co. A typical example is $Cr_3C_2$ hard particles dispersed in a nickel-chrome matrix. A blend of carbides such as WC, CrC, $Cr_3C_2$ with NiCr and metal powder can be used as well. Still another possibility is an agglomeration sintered or dense coated carbide powder. Such a wear and corrosion resistant coating 12 is applied to a turbine or compressor blade in order to reduce wear of the blade against the inside diameter of the engine's casing.

During high temperature treatment, a portion of the initial chrome carbide content of the powder becomes dissolved in the matrix material; during subsequent cooling this material reforms a second carbide distribution amongst the remaining initial carbides. The final microstructure is composed of matrix material, the large, primary carbides and the finer secondary carbides. The degree of carbide dissolution and the rate of subsequent cooling determine the relative proportions and characteristic microstructures of the primary and secondary carbides.

The properties of a coating 12 including, in particular, the wear behavior are altered by changes in the carbide distributions. In the development of an optimised coating 12, the desire to select the best microstructures demands a degree of control over the most influential process variables. As presented in this invention, measurement of the melt pool temperature gives both a valuable means to characterise a set of conditions and, if implementing the possibility of real-time laser control, enables coatings 12 to be produced at a specified melt pool temperature.

High power lasers such as $CO_2$, (fibre coupled) Nd—YAG or (fibre coupled) high power diode lasers offer a particularly attractive choice as energy source. Laser radiation can be focussed to small spots and can be easily modulated which allows precise control of the energy input into the material.

Figure 2:
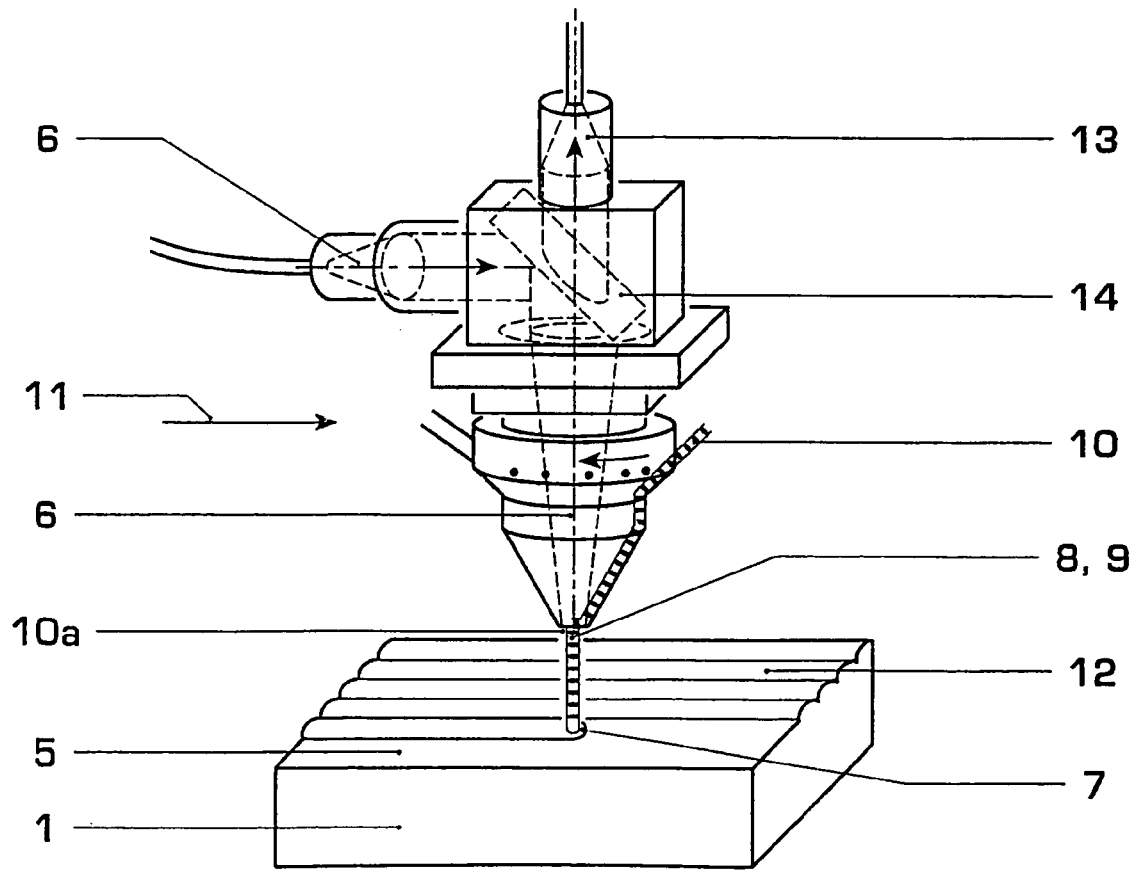
FIG. 2 illustrates an apparatus for carrying out the present invention.

FIG. 2 shows as an example an apparatus for controlled laser metal forming on the surface 5 of the article 1 according to the present invention. A laser beam 6 is moved over the surface 5 of the article 1 (or the article 1 is moved relative to the laser beam) thereby locally melting the surface 5 to form a melt pool 7. For coating or other laser metal forming applications material in the form of jet of powder 8 with a carrier gas 9 by means of a feeder 10 with a nozzle 10a or a wire is added to the melt pool 7. From the melt pool 7 an optical signal 13 is continuously captured and used for the determination of the temperature, the temperature fluctuations and existing temperature gradients as properties of the melt pool 7. With the present coating method a multiple or layered coating 12 can be applied. The process parameter can then be altered for different layers of the coating 12 or for different parts of the same layer of the coating 12. The present method also facilitates the coating of three dimensional (3D) objects. In one embodiment as seen in FIG. 2 the powder 8 injection can be concentric with respect to the cone of captured optical signals 13 from the melt pool 7.

Figure 3:
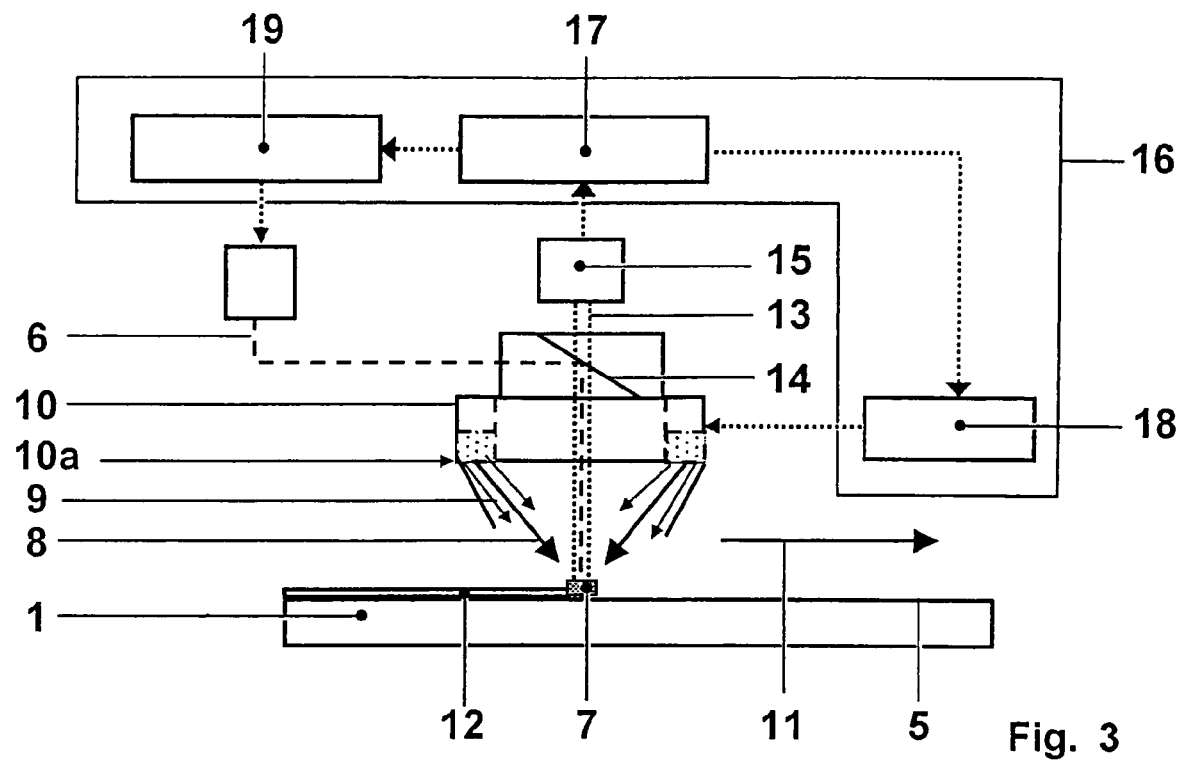
FIG. 3 illustrates an overall control system for carrying out the invention.

As seen from the FIG. 3, the information of the optical signal 13 is used in a feedback circuit within a control system 16 to adjust process parameter such as the laser power by means of a controller 19, the relative speed between the laser beam 6 and the substrate, the flow rate of the carrier gas 9, the mass feed rate of the injected powder 8, the distance between the nozzle 10a and the article 1 and the angle of the nozzle 10a to the article 1 by means of a controller 18 in a way that desired melt pool 7 properties are obtained. Subsequently the melt pool 7 solidifies as indicated in FIG. 2 with reference number 12.

The method uses a combination of a concentric feeder 10, a fiber coupled laser and an on-line monitoring system with real time capability. With the help of the online monitoring system optimum process conditions are established and maintained in order to obtained a desired microstructure which leads to a distribution of carbides resulting in optimum hardness and wear properties.

The new method combines laser power delivery, material supply and process monitoring in a dedicated laser/powder head as shown in FIG. 2. With the help of a dichroitic mirror 14 infrared (IR) radiation from the melt pool 7 is collected through the same optics which is used for laser focussing. The dichroitic mirror 14 transmits laser light and reflects process light of the optical signal 13 or vice versa.

The optical signal 13 from the melt pool 7 is coupled to a pyrometer 15 or another fiber-coupled detector which allows the online determination of the melt pool temperature. For this purpose the optical properties of the monitoring system are chosen such that the measurement spot is smaller than the melt pool and located at the center of the melt pool 7. In another embodiment according to the invention the optical signal 13 is captured from the center and vicinity of the laser focal spot using an imaging fibre bundle or a charged coupled device (CCD) camera that is equipped with suitable optical filters. This information is used to determine the temperature a single spot or simultaneously at several locations in the center and in the vicinity of the melt pool.

The cone of captured optical signals 13 from the melt pool 7 can be concentric with respect to the laser focussing cone. The symmetry of this arrangement ensures that laser-powder interaction does not change during movements on complex shaped components. This leads to consistent high quality of the process.

FIG. 3 shows the overall control system 16 for carrying out the invention. Besides a main process control 16 a controller 18 for controlling the feeder 10 and the whole apparatus and a controller 19 for controlling the laser is provided. The temperature information is used for the adjustment of process parameters such as the laser power, the relative speed between the laser beam 6 and the article 1, the feed rate of the injected powder 8 with the carrier gas 9 or an injected wire, the distance between the nozzle 10a and the article 1 and the angle of the nozzle 10a to the article 1. This automatic feedback control of the laser power by means of the controller 19 allows to establish a temperature field which is favourable for obtaining a desired microstructure. Moreover, the monitored optical signal 13 from the melt pool 7 allows to detect the onset of marangoni convection. Avoiding marangoni convection in the melt pool 7 will reduce the risk of hot tearing defects during solidification of the molten material.

As seen in FIG. 3, the online feed back controller 19 of the laser power is decoupled from the main process control 17 by means of a separate microprocessor. This allows faster parallel processing in real-time, i.e. independent from the operating system.

In another embodiment postprocessing of the optical signal 13 from the melt pool 7 is used for quality control: The analysis of the measured data allows to optimize process parameters such that a desired microstructure is obtained. Recording of monitoring signals serves also for documentation purposes and for ensuring consistent product quality.

Moreover, dedicated commercially available software tools (e.g. LabView RT) with enhanced functionality can be used for the realisation of the control system 16. As a consequence loop times <10 ms and advanced PID control features such as gain scheduling, which means the use of different sets of PID parameters in predefined temperature intervals can be realised.

EXAMPLE OF THE INVENTION

Enclosed is an example of the invention with an explanation of the microstructures observed in coatings produced from a mechanical powder mixture comprising, by weight, 75% ($Cr_3C_2$) and 25% (80% Ni-20% Cr alloy) on a MarM-247 substrate.

Figure 4:
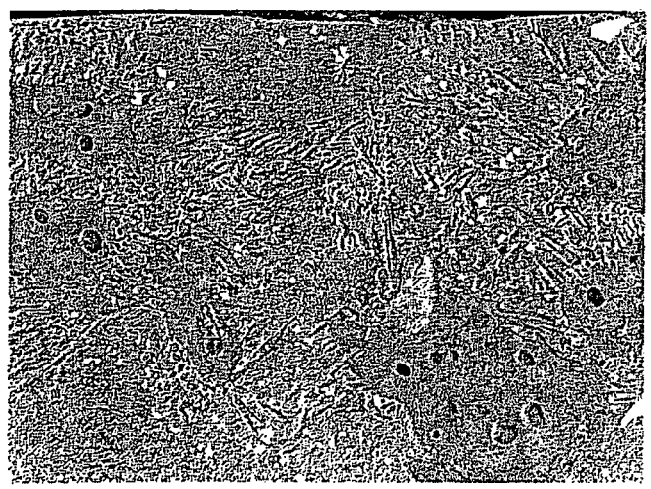
FIG. 4 shows a back-scattered electron (BSE) image of a LMF $Cr_3C_2$/Ni—Cr coating produced at 16 mm $sec^{-1}$ scan speed and melt pool temperatures of 1650° C.
Figure 5:
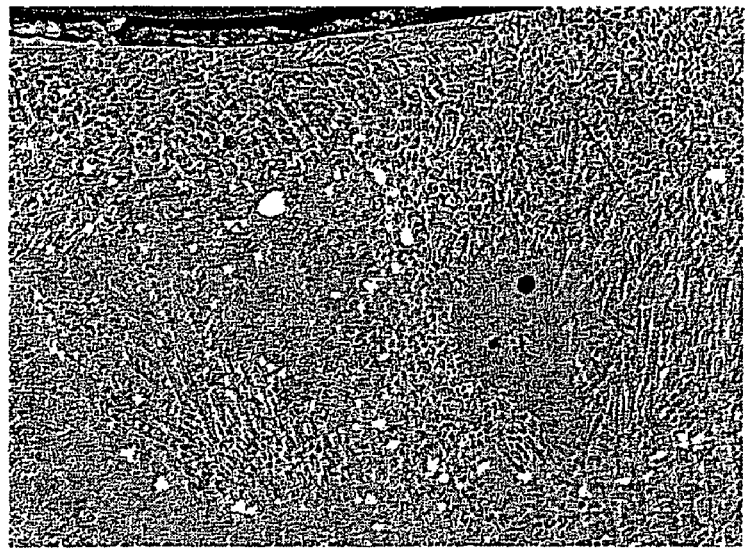
FIG. 5 shows a back-scattered electron image of a LMF $Cr_3C_2$/Ni—Cr coating produced at 16 mm $sec^1$ scan speed and melt pool temperatures of 1760° C.
Figure 6:
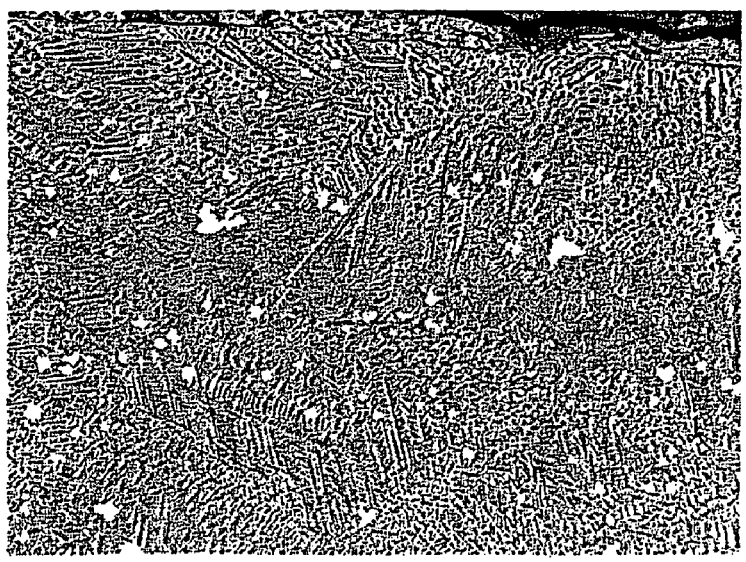
FIG. 6 shows a back-scattered electron image of a LMF $Cr_3C_2$/Ni—Cr coating produced at 16 mm $sec^{-1}$ scan speed and melt pool temperatures of 1930° C.

FIG. 4-6 compare the microstructure of LMF coatings: all using a 16 mm $sec^{-1}$ scan speed yet with various melt pool temperatures of 1650° C. (FIG. 4), 1760° C. (FIG. 5) and 1930° C. (FIG. 6). The three visible phases are matrix, $Cr_3C_2$ in both primary and secondary manifestations and small amounts of a third, dense phase. The matrix phase comprises, by weight, approximately 65% Ni 25% Cr with the remainder Al, W and Co. This is consistent with the 80% Ni 20% Cr matrix alloy becoming further alloyed during the process with the chrome carbide and with the most significant MarM-247 alloy additions. The large and slightly porous primary $Cr_3C_2$ is unchanged from its original stoichiometry. Principal MarM-247 alloying elements W and Co are detected in the secondary chrome carbide. The high brightness of the third phase in back-scattered electron (BSE) imaging is accounted for by its significant W and Co content. It is believed to be a $\mu$ or $\eta$ phase and was also observed in the untreated substrate material.

Figure 7:
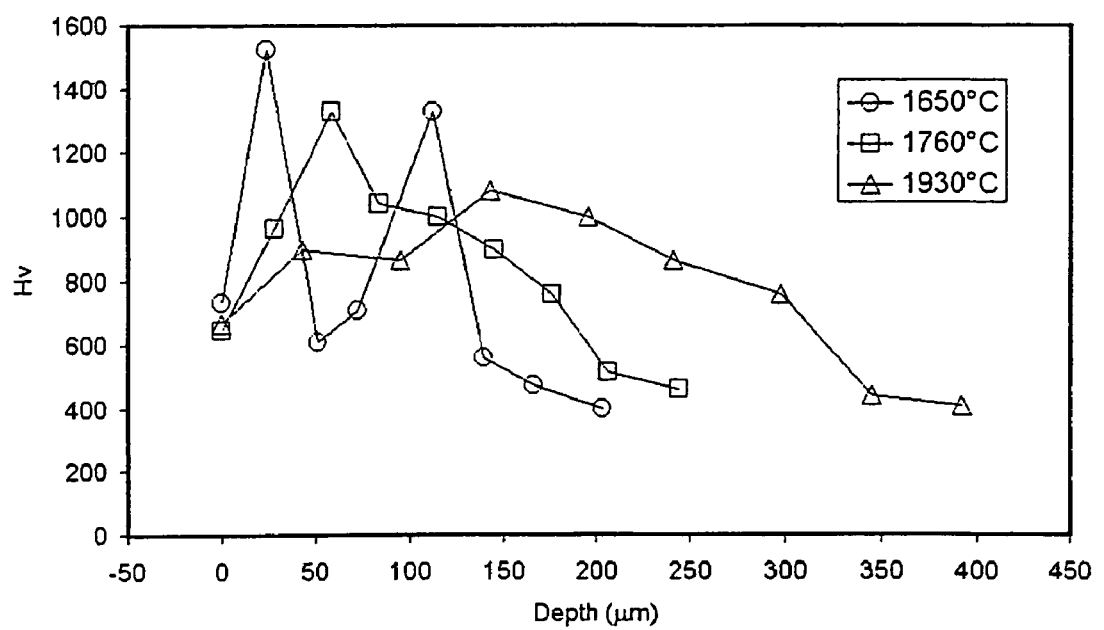
FIG. 7 shows three plots comparing Vickers microhardness profiles of LMF $Cr_3C_2$/Ni—Cr coatings produced at 16 mm $sec^{-1}$ and either 1650° C., 1760° C. or 1930° C.

Microhardness profiles relating to the three LMF conditions are shown in FIG. 7. Peaks in hardness above 1200 Hv indicate large, primary carbide particles, which are detected in LMF coatings at the lower two temperatures of 1650° C. and 1760° C. Being appreciably smaller than a typical indent cross-section (FIG. 4), secondary carbides are not individually resolved but are seen to increase the hardness of substrate or matrix material from approximately 400 Hv to 600-1000 Hv.

As the process temperature is raised, the increasing presence of secondary carbides reinforces matrix material surrounding the primary carbides; these primary carbides concurrently reduce in size and in number, as their dissolution in the melt pool becomes significant. Therefore a more uniformly hardened coating is produced during LMF at the higher temperatures of 1760° C. and 1930° C. LMF with the hottest, 1930° C. melt pool dissolves, or melts ($T_m$ $Cr_3C_2$=1920° C.), all the primary carbides such that only secondary carbides now contribute to hardening and a hardness profile no longer includes any outstanding peaks.

REFERENCE NUMBERS

1 Article, e.g. blades or vanes for gas turbines
2 Root portion
3 Platform
4 Blade
5 Surface of article 1
6 Laser beam
7 Melt pool
8 Powder
9 Carrier gas
10 Feeder
10*a* Nozzle
11 Direction of movement
12 Solidified material, coating
13 Optical signal
14 Dichroitic mirror
15 Pyrometer
16 Control system
17 Main process control
18 Controller for feeder 10 and nozzle 10*a*
19 Controller for laser 6

The invention claimed is:

1. A method of applying a laser metal formed hard layer with a controlled laser metal forming process on the surface of an article, the method comprising the steps of
   (a) moving a laser light source and a signal capturing apparatus and the article relative to each other, thereby
   (b) melting locally the surface of the article using the laser light source with a specific power for forming a melt pool,
   (c) injecting by means of a nozzle a powder with a carrier gas into the melt pool, the powder comprises a blend of carbides and metal powder or hard particles embedded in a matrix phase,
   (d) capturing an optical signal from the melt pool using the signal capturing apparatus,
   (e) using the monitored optical signal for the determination of at least one temperature value and fluctuations in temperature values as properties of the melt pool,
   (f) using the information of the at least one temperature value and the fluctuations in temperature values of the melt pool from the optical signal within a control system in a feedback circuit to adjust as process parameters one or a combination of the power of the laser light source, the relative speed between the laser light source and the article, the mass feed rate of the added coating material and/or of the carrier gas, the distance between the nozzle and the article and the angle of the nozzle to the article such that desired melt pool properties are obtained and subsequently
   (g) solidifying the melt pool.

2. The method of claim 1, wherein solid hard particles are dissolved by the molten matrix material and/or the hard particles are dissolved by a melt temperature sufficient to cause their fusion with matrix material.

3. The method of claim 1, wherein WC, CrC or $Cr_3C_2$ as hard particles, which are dispersed in a nickel-chrome matrix, are injected into the melt pool.

4. The method of claim 1, wherein a blend of WC, CrC, $Cr_3C_2$ and NiCr powder is injected into the melt pool.

5. The method of claim 1, wherein an agglomeration sintered or dense coated carbide powder is injected into the melt pool and wherein the main constituent of the dense coating or agglomerated material is either Ni or Cr.

6. The method of claim 1, comprising the step of adjusting the process parameters such that melt pool properties are obtained to avoid undesirable convection in the melt pool.

7. The method of claim 1, wherein the article consists of single-crystal or directionally solidified microstructure comprising the step of adjusting the melt pool properties to obtain epitaxial recrystallisation of the base material of the article.

8. The method of claim 1, wherein the laser light source is moved in respect to the article or the article is moved in respect to the laser light source.

9. The method of claim 1, wherein the heat input during the coating process is controlled.

10. The method of claim 1, wherein a coating on surface of the article is created.

11. The method of claim 10, wherein a multiple or layered coating on the surface of the article is created.

12. The method of claim 10, wherein the process parameters are altered for different layers of the coating or for different parts of the same layer of the coating.

13. The method of claim 1, wherein parts of the bulk of the article are formed by the application of the method.

14. The method of claim 1, wherein the laser light source power control is handled by a controller with a different processor than that used for main process control within the control system.

15. The method of claim 14, comprising the step of operating the laser light source power controller in real time.

16. The method of claim 1, wherein gain scheduling is used for predefining PID control parameters within the control system.

17. The method of claim 1, wherein post-processing of the optical signal from the molten pool is used for quality control purposes, optimization of process parameters and/or process documentation.

18. The method of claim 1, wherein the captured optical signal from the melt pool is directed to a pyrometer.

19. The method of claim 18, comprising the step of capturing the optical signal from a region in the center of the melt pool, whereby the pyrometer measurement spot is smaller than the laser light source spot.

20. The method of claim 1, comprising the step of capturing the optical signal by a fiber-coupled detector.

21. The method of claim 1, comprising further the steps of
(a) capturing an optical signal from the centre and vicinity of the laser light source focal spot,
(b) using an optical fiber or an imaging fibre bundle or a CCD camera to capture the optical signal and
(c) using the optical signal to determine the temperature at several locations in the center and in the vicinity of the melt pool.

22. The method of claim 1, wherein the powder injection is concentric with respect to the cone of captured optical signals from the melt pool.

23. The method of claim 1, wherein the cone of captured optical signals from the melt pool is concentric with respect to the laser light source focussing cone.

24. The method of claim 1, comprising the step of using a dichroitic mirror that transmits light from the laser light source and reflects light of the optical signal or vice versa.

25. The method of claim 1, comprising the step of using a fibre coupled high power diode laser as the laser light source.

26. The method according to claim 1, wherein the article is a gas turbine or compressor component made from a nickel or cobalt base super alloy or from steel.

27. The method according to claim 1, wherein step (e) further comprises determination of temperature gradients as a property of the melt pool; and step (f) further comprises using the information of the temperature gradients within the control system in the feedback circuit to adjust the process parameters.

* * * * *